United States Patent
Chrabascz et al.

(10) Patent No.: US 8,770,928 B2
(45) Date of Patent: Jul. 8, 2014

(54) AIR CYCLE MACHINE SEAL PLATE AND SEAL LAND

(75) Inventors: Eric Chrabascz, Longmeadow, MA (US); Darryl A. Colson, West Suffield, CT (US); Seth E. Rosen, Middletown, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 599 days.

(21) Appl. No.: 12/974,277

(22) Filed: Dec. 21, 2010

(65) Prior Publication Data

US 2012/0156008 A1 Jun. 21, 2012

(51) Int. Cl.
*F01D 11/02* (2006.01)

(52) U.S. Cl.
USPC ............................................ 415/174.5

(58) Field of Classification Search
USPC ................................... 415/231, 174.3
See application file for complete search history.

(56) References Cited

U.S. PATENT DOCUMENTS

| | | | |
|---|---|---|---|
| 4,500,098 A | 2/1985 | Wilcox et al. | |
| 4,655,683 A | 4/1987 | Chaplin | |
| 4,820,119 A | 4/1989 | Joyce | |
| 4,867,639 A * | 9/1989 | Strangman | 415/173.4 |
| 5,085,443 A * | 2/1992 | Richards | 277/412 |
| 5,224,842 A * | 7/1993 | Dziorny et al. | 417/406 |
| 5,249,934 A | 10/1993 | Merritt et al. | |
| 5,704,760 A | 1/1998 | Bouchard et al. | |
| 5,784,894 A | 7/1998 | Army, Jr. et al. | |
| 7,025,356 B1 | 4/2006 | Cheung et al. | |
| 7,056,087 B2 * | 6/2006 | Dean | 415/171.1 |
| 7,402,020 B2 | 7/2008 | Beers et al. | |
| 7,635,251 B2 | 12/2009 | Duesler et al. | |
| 7,909,335 B2 * | 3/2011 | Turnquist et al. | 277/355 |
| 2004/0119237 A1 * | 6/2004 | Datta | 277/355 |
| 2006/0006359 A1 * | 1/2006 | Alman et al. | 251/360 |
| 2007/0065277 A1 * | 3/2007 | Muller et al. | 415/170.1 |
| 2008/0025906 A1 * | 1/2008 | Lin et al. | 423/448 |
| 2009/0184475 A1 | 7/2009 | Dobek et al. | |
| 2009/0196742 A1 | 8/2009 | Turnquist et al. | |
| 2009/0230628 A1 | 9/2009 | Dobek et al. | |

* cited by examiner

*Primary Examiner* — Nathaniel Wiehe
*Assistant Examiner* — Jeffrey A Brownson
(74) *Attorney, Agent, or Firm* — Carlson, Gaskey & Olds, P.C.

(57) ABSTRACT

An air cycle machine includes turbine and compressor housings respectively having a turbine and a compressor. An insulator seal plate is fastened between the turbine and compressor housings. The insulator seal plate includes a bore. A seal has an outer diameter that engages the bore. The seal also includes an inner diameter provided between lateral sides defining a first width. The inner diameter provides a seal and configured to engage a rotating surface. The outer diameter to the inner diameter provides a first ratio of 1.30-1.31. The inner diameter to the first width provides a second ratio of 1.59-1.61. A rotor shaft is disposed in the seal and includes knife edges extending from the rotor shaft to the seal land. The rotor shaft supports the turbine and the compressor.

13 Claims, 2 Drawing Sheets

AIR CYCLE MACHINE SEAL PLATE AND SEAL LAND

BACKGROUND

This disclosure relates to a seal provided between a shaft and a housing of an air cycle machine.

An air cycle machine may include a centrifugal compressor and a centrifugal turbine mounted for co-rotation on a shaft within a housing. The centrifugal compressor further compresses partially compressed air, such as bleed air received from a compressor of a gas turbine engine. The compressed air discharges to a downstream heat exchanger or other use before returning to the centrifugal turbine. The compressed air expands in the turbine to thereby drive the compressor. The air output from the turbine may be utilized as an air supply for a vehicle, such as the cabin of an aircraft.

The shaft is rotationally supported by air bearings within the housing. A variety of seals are used between the shaft and the housing to seal the shaft relative to the housing. Some prior seals have an outer diameter/length/width of 3.460/0.685/0.16 inch (87.88/17.40/4.1 mm), 2.706/0.370/0.21 inch (68.73/9.40/5.3 mm) or 1.875/0.455/0.14 inch (47.63/11.30/3.6 mm).

SUMMARY

An air cycle machine includes turbine and compressor housings respectively having a turbine and a compressor. An insulator seal plate is fastened between the turbine and compressor housings. The insulator seal plate includes a bore.

A seal has an outer diameter that engages the bore. The seal also includes an inner diameter provided between lateral sides defining a first width. The inner diameter provides a seal land configured to engage a rotating surface. The outer diameter to the inner diameter provides a first ratio of 1.30-1.31. The inner diameter to the first width provides a second ratio of 1.59-1.61.

A rotor shaft is disposed in the seal and includes knife edges extending from the rotor shaft to the seal land. The rotor shaft supports the turbine and the compressor.

BRIEF DESCRIPTION OF THE DRAWINGS

The disclosure can be further understood by reference to the following detailed description when considered in connection with the accompanying drawings wherein.

DETAILED DESCRIPTION

Figure 1:
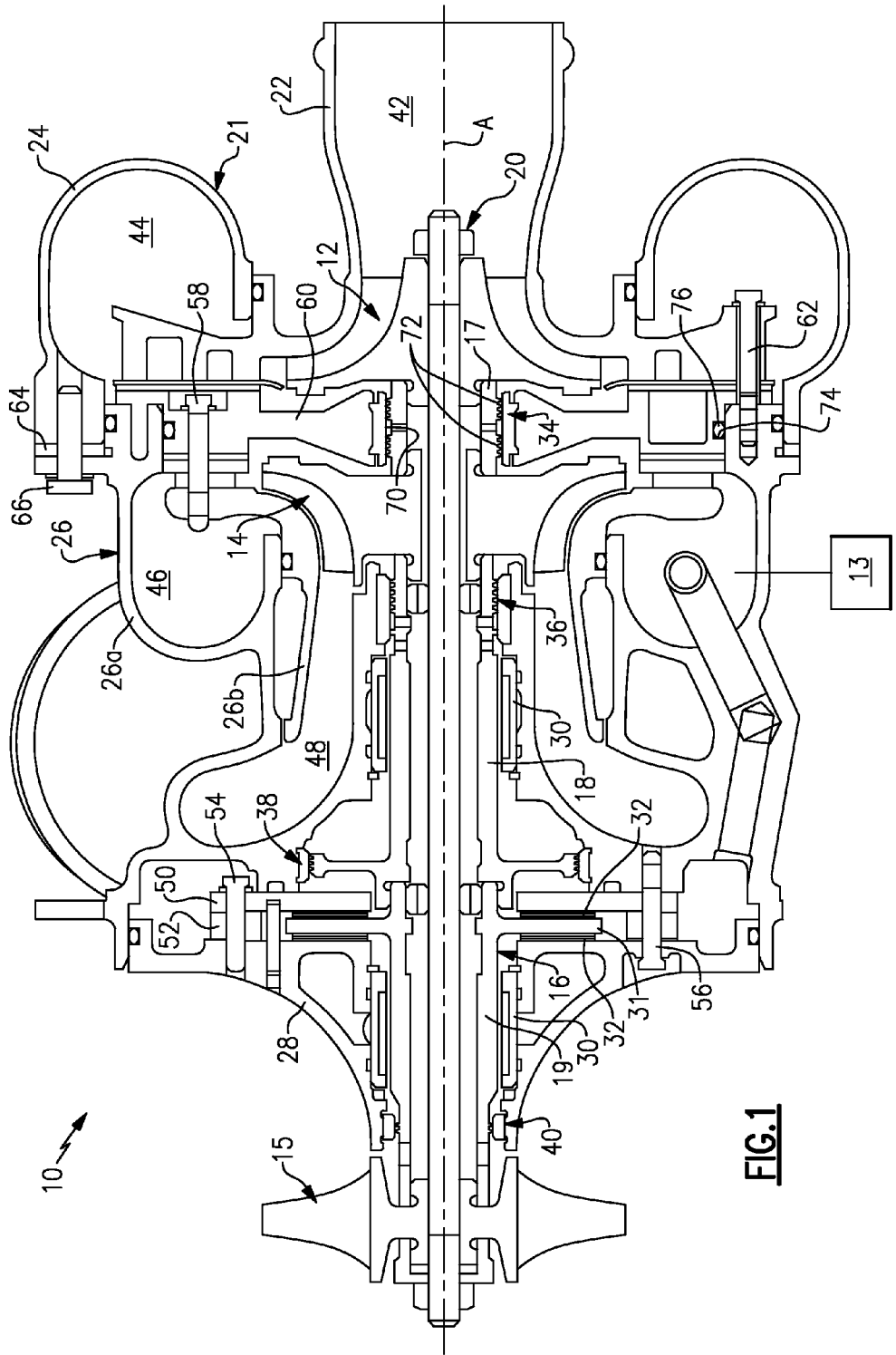
FIG. 1 is a cross-section of an example air cycle machine.

FIG. 1 illustrates an air cycle machine (ACM) 10 having a compressor 12 coupled to a turbine 14 by a shaft 16, which is stainless steel for example, for rotation together about an axis A. The turbine 14 is incorporated into a cabin air supply system 13 for providing conditioned air to an aircraft, for example. A fan 15 supported by the shaft 16 circulates the conditioned air within the cabin air supply system 13.

The ACM 10 is constructed from multiple portions to facilitate assembly. For example, the ACM 10 includes a housing 21 having inlet, compressor, turbine and bearing housing portions 22, 24, 26, 28. The example shaft 16 is constructed from multiple portions also. For example, the compressor 12 is mounted on first shaft portion 17 and arranged within the inlet housing portion 22; the turbine 14 is mounted between first and second shaft portions 17, 18 within the turbine housing portion 26; and a third shaft portion 19 is mounted within the bearing housing portion 28. A tie rod 20 secures the compressor 12, turbine 14, fan 15 and first, second, third shaft portions 17, 18, 19 to one another.

Journal bearings 30 rotationally support the second and third shaft portions 18, 19 respectively within the turbine and bearing housing portions 26, 28. A thrust runner 31 extends radially from the third shaft portion 19 and is axially arranged between thrust bearings 32. A retaining plate 50 is secured to the bearing housing portion 28 about the thrust runner 31 and thrust bearings 32 by first fasteners 54. An inlet plate 52 is provided between the bearing housing portion 28 and the retaining plate 50 radially outward of the thrust runner 31 to control the flow of lubricating air to the thrust bearings 32. Second fasteners 56 secure the bearing and turbine housing portions 28, 26 to one another.

The housing portions are sealed relative to one another to contain the compressed air within the desired passageways within the ACM 10. However, the seals also are designed to control the amount of air leakage from the compressor 12 and the turbine 14 within the ACM 10 to lubricate the journal and thrust bearings 30, 32. In the example, a first seal 34 is arranged between the first shaft portion 17 and an intermediate housing portion 60; second and third seals 36, 38 are arranged between the second shaft portion 18 and the turbine housing portion 26; and a fourth seal 40 is arranged between the third shaft portion 19 and the bearing housing portion 28.

The inlet housing portion 22 provides a compressor inlet 42, and the compressor housing portion 24 provides a compressor outlet 44. The turbine housing portion 26, which includes first and second turbine housing portions 26a, 26b, provides a turbine inlet 46 and a turbine outlet 48. Third fasteners 58 secure the turbine and intermediate housing portions 26, 60 to one another, and fourth fasteners 62 secure the inlet and turbine housing portions 22, 26 to one another.

A seal plate 64 is secured between the compressor and turbine housing portions 24, 26 by fifth fasteners 66. Air flows into the compressor inlet 42 and is compressed centrifugally to compressor outlet 44 where it is routed to turbine inlet 46. The compressed air expands through the turbine 14 and exits the turbine outlet 48.

Figure 2:
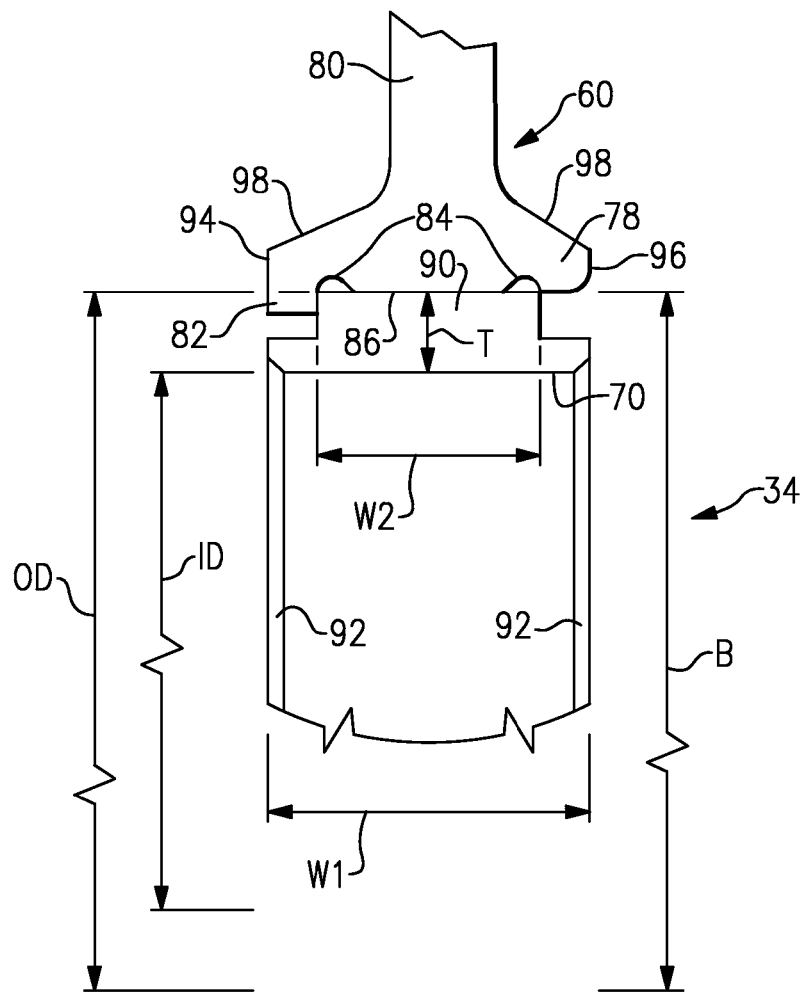
FIG. 2 is an enlarged cross-sectional view of a portion of the ACM of FIG. 1.
Figure 3:
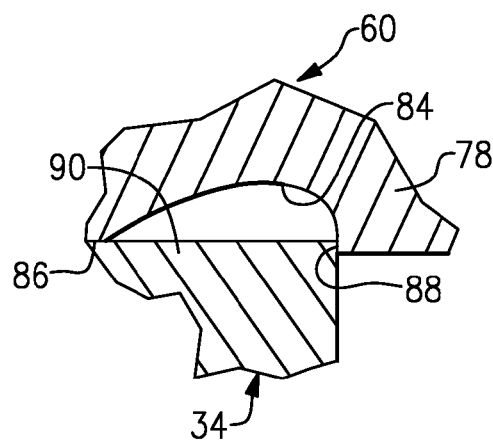
FIG. 3 is a further enlarged cross-sectional view of a seal illustrated in FIG. 2.

The intermediate housing portion, or insulator seal plate, 60 supports the first seal 34, which is constructed from a polyimide material. The first seal 34 includes a seal land that cooperates with knife edges 72 on the first shaft portion 17 to seal air within the ACM 10, while permitting some air leakage past the first seal 34 at a desired rate. The first seal 34 is shown in more detail in FIGS. 2 and 3 and is provided by an annular body having an outer diameter OD and an inner diameter ID, which are provided between lateral sides defining a first width W1.

The intermediate housing portion 60, which is constructed from carbon fiber for its insulative and thermal stability properties, includes a bore having a diameter B of about 1.260 inch (32.00 mm). The intermediate housing portion 60 includes an annular support 78 arranged radially inward of a radial member 80 that separates the back sides of the compressor 12 and the turbine 14. The radial member 80 is axially narrower than the annular support 78, which has a width defined by lateral sides 94, 96. The radial member 80 is about 0.2 inch (5.08 mm) wide and offset to one side of the annular support 78 about 0.2 inch (5.08 mm). The annular support 78 is wider that the first width W1, for example. The radial thickness of the annular support 78 is about 0.2 inch (5.08 mm) and includes surfaces 98 that taper about 20 degrees toward the radial member 80.

An annular groove 74 in the intermediate housing portion 60 supports an o-ring 76, which is axially aligned with the first seal 34, that seals the intermediate housing portion 60 relative to the turbine housing portion 26.

The inner diameter ID provides the seal land 70 that engages rotating surfaces of the knife edges 72, providing a nominal clearance of 0.003 inch (0.076 mm). The seal land 70 has chamfers 92 at the inner diameter ID. The first shaft portion 17 has eight knife edges. The outer diameter OD to the inner diameter ID provides a first ratio (OD/ID) of 1.30-1.31, and the inner diameter ID to the first width W1 provides a second ratio (ID/W1) of 1.59-1.62.

The outer diameter OD is nominally about 1.267 inch (32.18 mm), and the inner diameter is nominally about 1.07 inch (27.1 mm) in an uninstalled condition. The first width W1 is nominally about 0.605 inch (15.37 mm). The first seal 34 is pressed into the bore, and the seal land 70 is subsequently machined to the ID dimension. The outer diameter is nominally about 1.260 inch (32.00 mm), and the inner diameter ID is nominally about 0.9710 inch (24.663 mm) in an installed condition. With the first seal 34 pressed into the intermediate housing portion 60, the first shaft portion 17 is inserted into the first seal 34. The compressor 12 and turbine 14 then are installed into the first shaft portion 17 on opposing sides of the intermediate housing portion 60.

The first seal 34 is mounted in the intermediate housing portion 60 in an interference/snap-fit relationship. In the installed position, the first seal 34 abuts an annular flange 82. Recesses 84 are provided on either side of a seat 86 and adjacent to the flange 82 and a lip 88. The axial distance between the flange 82 and the lip 88 is slightly larger than an annular base 90 of the first seal 34, providing a second width W2, which is nominally about 0.405 inch (10.29 mm). The annular base 90 is axially centered relative to the seal land 70 and has ends axially aligned with the recesses 84. The first width W1 to second width W2 provides a third ratio of 1.46-1.53.

Although an example embodiment has been disclosed, a worker of ordinary skill in this art would recognize that certain modifications would come within the scope of the claims. For that reason, the following claims should be studied to determine their true scope and content.

What is claimed is:

1. A seal assembly for an air cycle machine comprising:
   an insulator seal plate having a bore;
   a seal having an outer diameter engaging the bore and an inner diameter provided between lateral sides defining a first width, the inner diameter providing a seal land configured to engage a rotating surface, the outer diameter to the inner diameter providing a first ratio of 1.30-1.31, and the inner diameter to the first width providing a second ratio of 1.59-1.61, wherein the seal is constructed from a polyimide; and
   wherein the seal has an annular base extending radially outward from the seal land and including a second width, the first width to the second width providing a third ratio of 1.46-1.53, wherein the second width is nominally about 0.405 inch, the annular base received in a snap-fit relationship with respect to the insulator seal plate.

2. The seal assembly according to claim 1, wherein the outer diameter is nominally about 1.267 inch and the inner diameter is nominally about 1.07 inch in an uninstalled condition, and the first width is nominally about 0.605 inch.

3. The seal assembly according to claim 2, wherein the outer diameter is nominally about 1.260 inch and the inner diameter is nominally about 0.9710 inch in an installed condition.

4. The seal assembly according to claim 1, wherein the annular base is axially centered relative to the seal land.

5. A seal assembly for an air cycle machine comprising:
   an insulator seal plate having a bore, wherein the insulator seal plate is constructed from a carbon fiber material;
   a seal having an outer diameter engaging the bore in an interference fit relationship, and the seal including an inner diameter provided between lateral sides defining a first width, the inner diameter providing a seal land configured to engage a rotating surface, the outer diameter to the inner diameter providing a first ratio of 1.30-1.31, and the inner diameter to the first width providing a second ratio of 1.59-1.61, wherein the seal has an annular base extending radially outward from the seal land and including a second width, the first width to the second width providing a third ratio of 1.46-1.53;
   wherein the insulator seal plate includes an annular support providing the bore and including an annular flange against which the seal abuts, the bore including spaced apart recesses axially aligned with the ends of annular base and arranged adjacent to the flange and a lip that is spaced from the flange, the lip axially retaining the seal relative to the insulator seal plate in an installed condition; and
   wherein the seal has an annular base extending radially outward from the seal land and including a second width, the first width to the second width providing a third ratio of 1.46-1.53, wherein the second width is nominally about 0.405 inch, the annular base received in a snap-fit relationship with respect to the insulator seal plate.

6. The seal assembly according to claim 5, wherein the bore is nominally about 1.260 inch.

7. An air cycle machine comprising:
   turbine and compressor housings respectively having a turbine and a compressor;
   an insulator seal plate fastened between the turbine and compressor housings, the insulator seal plate having a bore;
   a seal constructed from a polyimide and having an outer diameter engaging the bore in an interference fit relationship, and the seal including an inner diameter provided between lateral sides defining a first width, the inner diameter providing a seal land configured to engage a rotating surface, the outer diameter to the inner diameter providing a first ratio of 1.30-1.31, and the inner diameter to the first width providing a second ratio of 1.59-1.61;
   a rotor shaft disposed in the seal and including knife edges extending from the rotor shaft to the seal land, the rotor shaft supporting the turbine and the compressor; and
   wherein the seal has an annular base extending radially outward from the seal land and including a second width, the first width to the second width providing a third ratio of 1.46-1.53, wherein the second width is nominally about 0.405 inch, the annular base received in a snap-fit relationship with respect to the insulator seal plate.

8. The air cycle machine according to claim 7, wherein the outer diameter is nominally about 1.267 inch and the inner diameter is nominally about 1.07 inch in an uninstalled condition, and the first width is nominally about 0.605 inch.

9. The air cycle machine according to claim 8, wherein the outer diameter is nominally about 1.260 inch and the inner diameter is nominally about 0.9710 inch in an installed condition.

10. The air cycle machine according to claim 7, wherein the insulator seal plate includes an annular support providing the bore and including an annular flange against which the seal abuts, the bore including spaced apart recesses axially aligned with ends of the seal and arranged adjacent to the flange and a lip that is spaced from the flange, the lip axially retaining the seal relative to the insulator seal plate in an installed condition.

11. The air cycle machine according to claim 10, wherein the insulator seal plate includes a radial member extending radially outwardly from the annular support and separating the turbine and the compressor from one another.

12. The air cycle machine according to claim 7, wherein the insulator seal plate includes an annular groove supporting an o-ring that sealingly engages the turbine housing.

13. A method of installing a seal into an air cycle machine comprising:

pressing a seal into an insulator seal plate to engage an outer diameter of the seal with the insulator seal plate, the seal including an inner diameter provided between lateral sides defining a first width, the inner diameter providing a seal land, the outer diameter to the inner diameter providing a first ratio of 1.30-1.31, and the inner diameter to the first width providing a second ratio of 1.59-1.61, wherein the seal has an annular base extending radially outward from the seal land and including a second width, the first width to the second width providing a third ratio of 1.46-1.53, wherein the second width is nominally about 0.405 inch, the annular base received in a snap-fit relationship with respect to the insulator seal plate during pressing;

machining the inner diameter after the pressing step;

inserting a rotor shaft into the seal and providing a clearance between the seal and the rotor shaft of nominally about 0.003 inch; and supporting a turbine on the rotor shaft on one side of the insulator seal plate and supporting the compressor on the rotor shaft on the other side of the insulator seal plate.

\* \* \* \* \*